United States Patent [19]
Nishizawa

[11] Patent Number: 5,207,618
[45] Date of Patent: May 4, 1993

[54] PRETENSIONER FOR VEHICLE SEAT BELT SYSTEMS

[75] Inventor: Muneo Nishizawa, Shiga, Japan

[73] Assignee: Takata Corporation, Tokyo, Japan

[21] Appl. No.: 717,348

[22] Filed: Jun. 18, 1991

[30] Foreign Application Priority Data

Jun. 18, 1990 [JP] Japan ................................. 2-159476

[51] Int. Cl.⁵ .............................................. F16H 7/08
[52] U.S. Cl. .................... 474/101; 280/804; 74/2; 297/480
[58] Field of Search .............. 474/101; 280/806; 74/2; 297/216, 468, 480

[56] References Cited

U.S. PATENT DOCUMENTS

| 4,435,000 | 3/1984 | Chiba et al. | 297/480 X |
| 4,841,788 | 6/1989 | Thuries et al. | 74/2 |
| 4,948,171 | 8/1990 | Knabel et al. | 280/806 |
| 4,999,004 | 3/1991 | Skanberg et al. | 74/2 X |

FOREIGN PATENT DOCUMENTS 3932090 11/1990 Fed. Rep. of Germany ...... 280/806

Primary Examiner—Thuy M. Bui
Assistant Examiner—Roger J. Schoeppel
Attorney, Agent, or Firm—Brumbaugh, Graves, Donohue & Raymond

[57] ABSTRACT

A pretensioner for a vehicle seat belt system comprises a casing, a drive mechanism including a spring having an operating end and an output member coupled to the operating end, a trigger mechanism for restraining the drive mechanism in a preloaded state and including a toggle linkage engaged between the casing and the drive mechanism, and a sensor mechanism having a output member for releasing the trigger mechanism upon acceleration in excess of a predetermined value by causing articulation of the toggle linkage about a pivot axis such that it ceases to be engaged between the drive mechanism and the casing and thereby releases the drive mechanism from the preloaded state.

1 Claim, 3 Drawing Sheets

PRETENSIONER FOR VEHICLE SEAT BELT SYSTEMS

BACKGROUND OF THE INVENTION

The present invention relates to a pretensioner for vehicle seat belt systems, and in particular to a trigger for operating a pretensioner.

In the seat belt systems provided on a vehicle, such as an automobile, a pretensioner for tightening the belt is furnished in some cases for restraining the body of an occupant more firmly in an emergency. There are various types of pretensioners, such as those that rotate the belt reel of a seat belt retractor, those that directly pull the belt into a loop, or those that pull on the buckle. As the driving mechanism for such pretensioners, it is known to use a piston/cylinder operated by gunpowder or to use a spring. A driving mechanism using gunpowder requires an electric trigger to operate, and this involves an increased cost. For this reason, a spring-type pretensioner with a purely mechanical structure is preferred.

However, the driving mechanism to operate the pretensioner must have a sufficient stroke length and operating force to apply pretension to the belt. Particularly when a spring is used in the driving mechanism, a powerful spring must be used. The preload for such spring is high, and in order to release the preload, a trigger mechanism capable of exerting considerable operating force and an acceleration detecting sensor that outputs a mechanical signal large enough for operating the trigger mechanism are required.

In the past, the mechanical sensors have been disclosed by the Provisional Japanese Utility Model Publications No. 90159/1982 and No. 33060/1983; Japanese Utility Model Publication No. 35017/1988; and Provisional Japanese Patent Publications No. 206765/1983, No. 164650/1989, and No. 164651/1989. According to all of these documents, an inertia body directly supported by a trigger is moved by inertial force to operate the trigger.

However, the conventional arrangement requires a large inertia body for obtaining sufficient sensor output and a lever with a long arm for amplifying the sensor output to exert a high operating force. This results in a large size and a heavy weight of these mechanisms associated with the pretensioner.

SUMMARY OF THE INVENTION

To solve the above problems, the object of the present invention is to provide a pretensioner for a vehicle seat belt system, by which it is possible to operate the driving mechanism by a trigger that occupies a small space, and which can be reliably operated by a small sensor output by the use of a toggle member and a new approach in the setting procedure.

The foregoing object is attained, in accordance with the present invention, by a pretensioner for a vehicle seat belt system comprising a casing, a drive mechanism including a spring having an operating end and an output member coupled to the operating end, a trigger mechanism for restraining the drive mechanism in a preloaded state and including a toggle linkage engaged between the casing and the drive mechanism, and a sensor mechanism having a output member for releasing the trigger mechanism upon acceleration in excess of a predetermined value by causing articulation of the toggle linkage about a pivot axis such that it ceases to be engaged between the drive mechanism and the casing and thereby releases the drive mechanism from the preloaded state.

In a pretensioner according to the present invention, the output member of the sensor mechanism is operated by detecting acceleration, and the toggle member is caused to articulate at the pivot axis and ceases to restrain the operating end of the driving spring. The preload applied on the driving spring is released, and the output member is displaced by the operating end of the driving spring. Thus, pretension is applied to the seat belt, which can be accomplished in any of the known ways referred to above.

For a better understanding of the invention, reference may be made to the following description of an exemplary embodiment, taken in conjunction with the accompanying drawings.

DESCRIPTION OF THE EMBODIMENT

Figure 7:
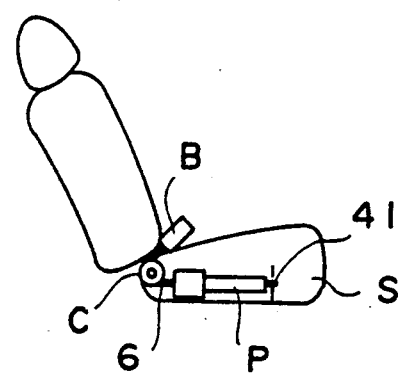
FIG. 7 is a side view showing an example of the installation of the embodiment on a vehicle seat.

As shown in FIG. 7, the pretensioner P has an anchor fitting 41 fastened to a frame of a vehicle seat S. One end of a wire 6 is connected to a driving mechanism incorporated in the pretensioner. The wire 6 leads from the pretensioner around a pulley C and is connected at its other end to a buckle B, which is a component of the seat belt system. The operation of the pretensioner results in pulling the buckle toward the pulley C, which tightens the belt firmly against the body of an occupant of the seat.

Referring to FIGS. 1 to 4, the pretensioner P comprises a compression spring 1, which is connected to a trigger mechanism 2 for maintaining the compression spring 1 compressed with a set preload by indirect restraint of the operating end 1a of the spring and for releasing the spring by eliminating the restraint, and a sensor mechanism 3 for operating the trigger 2 through the detection of acceleration. The trigger 2 comprises a toggle linkage 21 that normally is engaged between a portion of a casing 4 of the pretensioner and the output wire 6 of the drive mechanism. The sensor mechanism 3 comprises an acceleration sensor and an output member 31 arranged to cause the toggle member 21 to articulate and thereby cease to be engaged between the output wire and the casing.

The compression coil spring 1 is received within the tubular front casing 4 under compression between a shoulder on a rear case section 42 and an abutment member 5, which is engaged by the operating end 1a of the spring 1 and is slidably received in the casing 4. One end of the wire 6 passes through the member 5 and is
} held by a self-locking ring 7. The other end of the wire is connected to the buckle B (see FIG. 7). On the front end of the main unit 4, which is to the right in FIGS. 1 and 6, the anchor fitting 41 for fastening the pretensioner to the seat (or some other part of the vehicle) is screwed into inner threads 4a in the casing 4. The rear case 42, in which the sensor 3 and the trigger 2 are located, is screwed into the rear end of the front casing 4.

Figure 1:
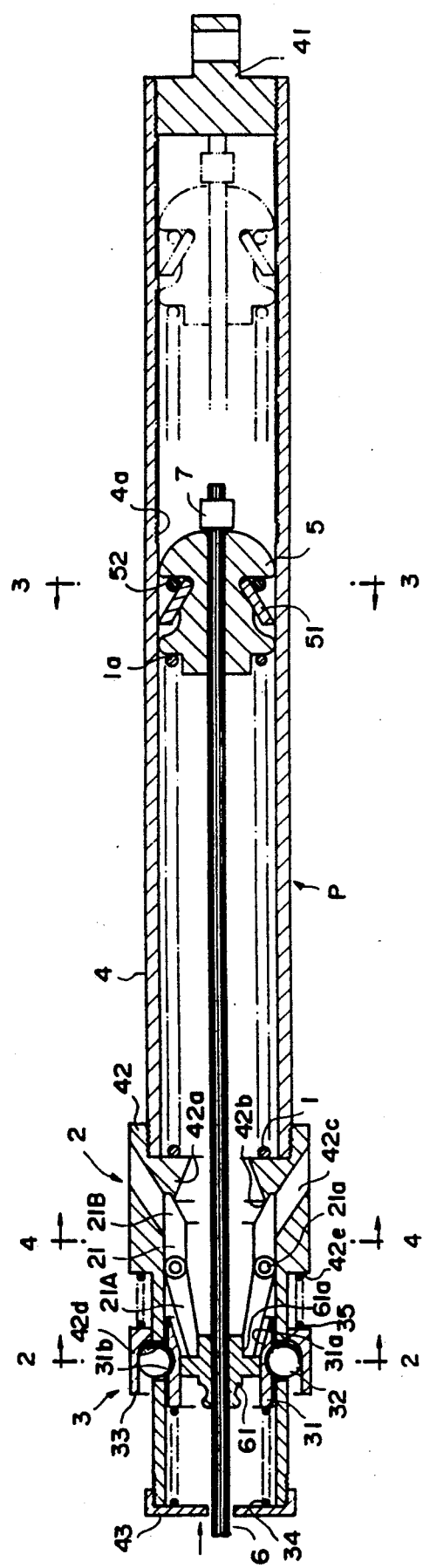
FIG. 1 is a longitudinal cross-sectional view of an embodiment of the pretensioner according to the present invention.
Figure 3:
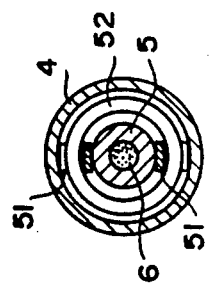
FIG. 3 is a cross-sectional view along the lines 3—3 in FIG. 1.
Figure 4:
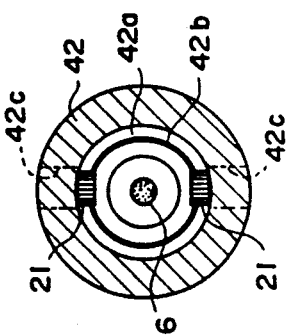
FIG. 4 is a cross-sectional view along the lines 4—4 in FIG. 1.
Figure 2:
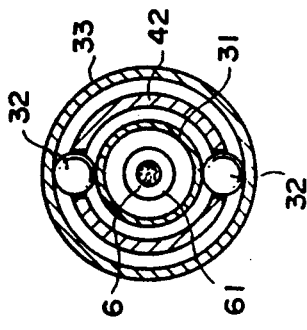
FIG. 2 is a cross-sectional view along the lines 2—2 in FIG. 1.
Figure 5:
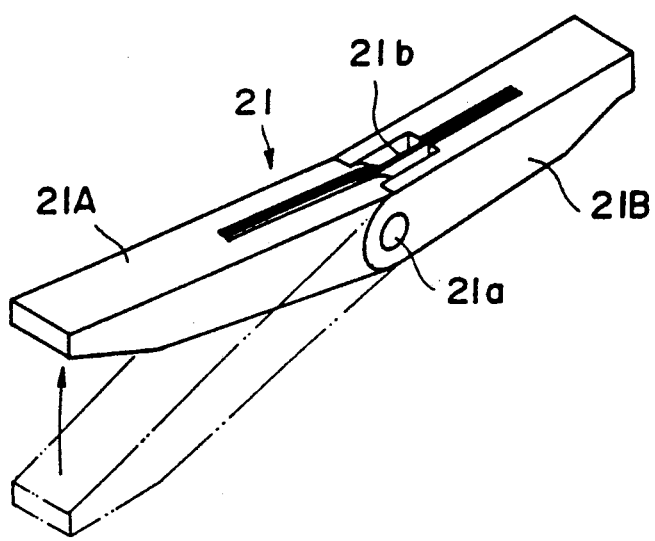
FIG. 5 is a perspective view of a toggle linkage of the embodiment.

As shown in detail in FIG. 5, the trigger 2 comprises a pair of toggle linkages 21 (FIG. 1 shows both of them). Each toggle linkage 21 has a front link 21B and a rear link 21A that are pivotally connected to each other for articulation by a pivot pin 21a. A torsion coil spring 21b received on the pivot pin 21a with its legs in contact with the outer surfaces of the arms 21A and 21B applies a weak spring force on the toggle linkage member 21 such as to bias it to the position shown by the phantom lines in FIG. 5, i.e., opposite to the arrow.

Returning to FIG. 1, a stopper 61 is fastened, such as by crimping, on the wire 6. The stopper 61 has a step formed by a smaller diameter portion 61a on its front outer periphery, and the step is engaged by the rear end of the rear link 21A of each toggle linkage 21. This maintains the toggle linkage 21 in the extended state shown in FIG. 1 by preventing the inward displacement of the toggle linkage 21 at the pivot axis of the pin 21a.

The sensor mechanism 3 is provided with a step-up output member and comprises an inertial body 33 received for sliding movement along the outer periphery of a portion of reduced diameter along the rear portion of the rear case 42. In the set condition (FIG. 1), the inertia body overlies in the radial direction a plurality of steel balls 32 (two in the present embodiment), which are received in openings 42d in the case 42. An output member 31 engages the steel balls 32 from inside and is restrained from axial displacement by the nesting engagement in outer grooves 31b of the steel balls 32. An operating spring 34 engaged under compression between a rear end cover 43 of the rear case 42 and the output member 31 biases the output member 31 forwardly. Between the front end of the inertia body 33 and a shoulder 42e on the case, a spring 36 that provides a spring force for setting the detection acceleration G for generating the displacement of the inertia mass body 33 is installed.

On the forwardmost part of the rear case 42, an internal collar 42a supporting the front end of the front link 21B of each toggle linkage 21 is provided, and a peripheral projection 42b protrudes rearwardly from the end surface of the collar 42a. A toggle member ejection hole 42c with its opening in communication with the outer periphery of the collar 42a is also provided, and this hole 42c is obliquely oriented toward the front from the inner edge to the outer edge with respect to the axis of the case 4.

The abutment 5 on the front end of the wire 6 has a groove that receives a plurality of check wedges 51. The front ends of the check wedges 51 are biased inwardly by a garter spring 52, and the rear ends are thereby biased into engagement with the inner wall surface of the case 4.

The preload of the compression spring 1 is maintained by indirect restraint of the operating end 1a by means of the wire 6 as shown in FIG. 1. The rear end of each toggle linkage 21 engages the stopper 61, and the front end engages the end surface of the collar 42a of the rear case 42. In this condition, each toggle linkage 21 is held under the preload of the spring between the stopper 61 and the case 42 and portions of the linkage adjacent the connecting point (pivot axis) are supported against the inner wall of the case 42. Further, the rear link 21A is confronted by the front inner conical surface 31a of the output member 31 of the sensor mechanism which keeps it slightly bent inwardly, should it tend to displace outwardly. The front end of the front link 21B is prevented from displacing inwardly by the rearward projection 42b of the collar.

Figure 6:
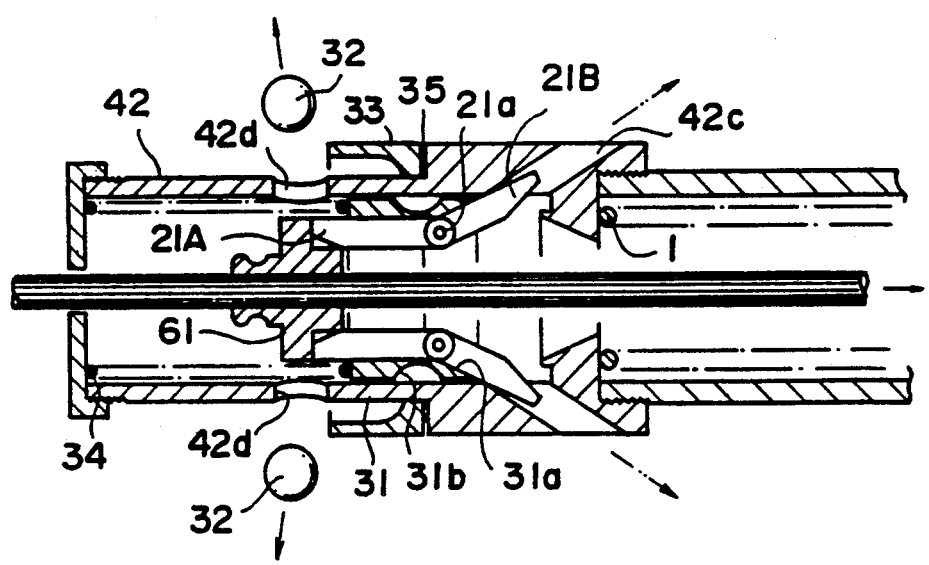
FIG. 6 is a partial cross-sectional view showing the operation of the embodiment.

Under such set condition, if an acceleration G above a predetermined value occurs in case of vehicle collision, and if the product of the acceleration and the mass of the inertia body 33 exceeds the sum of the force of the spring 35 and the frictional force between the steel balls 32 and the body, the inertia body 33 rapidly moves forward, compressing the spring 35 as shown in FIG. 6. When it reaches the position such as to release the steel balls 32, the steel balls 32 are pushed outwardly in the radial direction, as shown by an arrow, by the radial vector component of the force transmitted by the groove wall 31b of the output member 31 due to the force of the operating spring 34. Thus, the balls are ejected out of the rear case 42.

When the steels balls 32 are ejected, there is nothing to stop the forward movement of the output member 31, and the energy stored in the operating spring 34 is quickly released such as to drive the member 31 forward. The front conical surface 31a enters between the rear link 21A of each toggle linkage 21 and inner wall surface of the rear case 42 and by a wedging action pushes the link 21A inwardly. As a result, the toggle linkage 21 articulates to the position shown. When the toggle linkage 21 articulates, the front end of the front link 21B enters into the opening of the discharge hole 42c upon disengaging from the collar 42a of the rear case 42. The toggle linkages 21, losing the support points on their forward ends, are pushed by the stopper 61 and are ejected from the rear case 42, as shown by phantom arrowed lines in FIG. 6. Accordingly, there is no more hindrance in the forward movement of the stopper member 61.

The abutment 5 is driven forward upon extension of the compression coil spring 1 and is displaced to the forward-most position shown by the phantom lines in FIG. 1. During this operation, the check wedges 51 enlarge the diameter of the garter spring 52 and move with the abutment 5, while keeping contact with the inner peripheral wall of the case 4. By this forward movement of the piston, the wire 6 is rapidly pulled into the pretensioner P, and the buckle B is pulled down, as described above. When pretension is given to the belt and the load due to acceleration in the collision is applied on the occupant, the belt tension is transmitted to the abutment 5 through the wire 6, and the tension force tending to pull back the abutment piston 5 begins to work. During such pull-back operation, the tips of the check wedges 51 engage with the inner threads 4a provided inside the front portion of the casing 4 and perform a checking action to block the backward movement of the abutment piston 5.

By the pretensioner of the invention, more accurate operation of the trigger is assured because the operating spring 34 is operated using the output from the inertial movement of the inertia body 33 as a trigger and because the sensor output of the output member 31 is increased by the spring 34.

Because the toggle linkages 21 of the trigger and the steel balls 32 of the sensor are ejected during operation of the pretensioner, there is no need to provide the space for those elements to move into in the case 4, and the device can be designed in compact form.

Further, the pretensioner is designed in a cylindrical shape of a relatively small outer diameter, and it can be conveniently installed on the seat of a vehicle.

The features of the present invention have been described in detail in connection with an embodiment, whereas the present invention is not limited to the embodiment, and various changes and modifications can be adopted within the scope of the description in the claims.

For example, the output member can be constituted directly by an inertia body, or the sensor mechanism can be separately furnished from the case to operate the output member by remote operation. Further, it is possible to provide the sensor means and trigger adjacent the front of the case. In such case, the stopper member to engage with the trigger is mounted on the wire in front of the abutment.

As described above, it is possible by the use of the pretensioner of the present invention to minimize the space of installation of the trigger in the pretensioner and to design the entire device in compact form because the trigger is composed of simple toggle linkages. The operating force required for causing articulation of the toggle member may be very low, and the set load can be released by small operating force despite the strong set load of the driving mechanism. Thus, a pretensioner having stable operating characteristics can be provided.

I claim:

1. A pretensioner for a vehicle seat belt system comprising a casing, drive means including a spring having an operating end and an output member coupled to the operating end, trigger means for restraining the drive means in a preloaded state and including a pair of toggle linkages positioned in opposite sides of the drive means output member and normally engaged between the casing and the drive means in a position ahead of dead-center, and sensor means responsive to acceleration in excess of a predetermined value and having a tubular output member coaxial with the drive means output member for releasing the rigger means by moving axially of the drive means output member to cause articulation of each toggle linkage about a pivot axis past dead-center such that it ceases to be engaged between the drive means and the casing and thereby releases the drive means from the preloaded state.

* * * * *